Dec. 22, 1936.   R. H. MAUTSCH   2,065,192
HEATING, COOLING, AND VENTILATING SEATED ENCLOSURE
Filed June 13, 1934   2 Sheets-Sheet 1
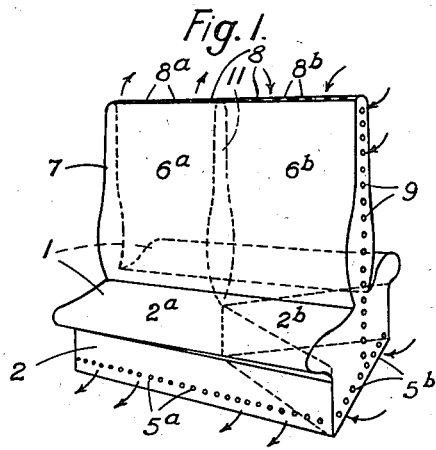
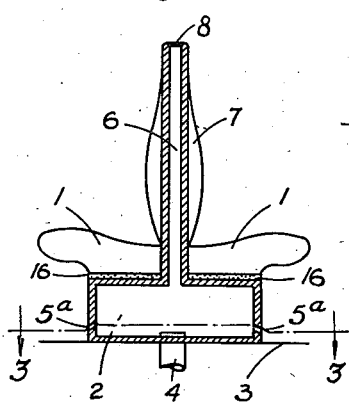 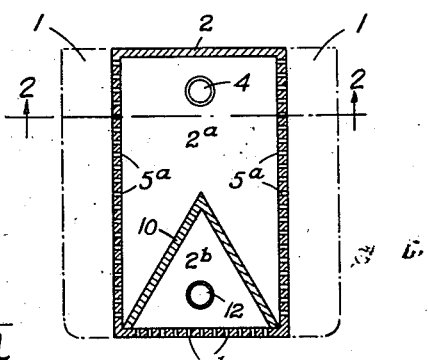
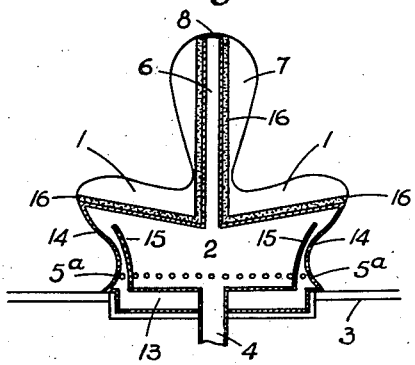
INVENTOR
ROBERT HENRI MAUTSCH
BY *Wm. M. Cady*
ATTORNEY Dec. 22, 1936.       R. H. MAUTSCH       2,065,192
HEATING, COOLING, AND VENTILATING SEATED ENCLOSURE
Filed June 13, 1934        2 Sheets-Sheet 2

INVENTOR
ROBERT HENRI MAUTSCH
BY  Wm. M. Cady
ATTORNEY

Patented Dec. 22, 1936

2,065,192

UNITED STATES PATENT OFFICE 2,065,192

HEATING, COOLING, AND VENTILATING SEATED ENCLOSURE

Robert Henri Mautsch, Brussels, Belgium, assignor to The Westinghouse Air Brake Company, Wilmerding, Pa., a corporation of Pennsylvania Application June 13, 1934, Serial No. 730,454
In Belgium June 21, 1933

6 Claims. (Cl. 98—10)

The present invention relates to heating, cooling or ventilating enclosures provided with seats by the circulation of hot or cold air therethrough, and more particularly to the application of such apparatus to the seats of vehicles. In existing apparatus for this purpose perforated distributing ducts are usually located along the walls or underneath the seats of the enclosure and are supplied with air under relatively high pressure from pipes of relatively small section in order to economize space. Owing to the small capacity of the pipes and ducts the air cannot adequately expand before being emitted from the ducts and thus issues in noisy jets, and at such a speed as to create disagreeable currents and to raise dust in the enclosure, especially in the case of vehicles. On the other hand, when the distributing ducts are located underneath the seats, the free space underneath these which should be open to permit of the diffusion of the air in the enclosure, constitutes a receptacle for dust and refuse which is unhygienic.

These various disadvantages are overcome by the present invention one feature of which consists essentially in incorporating with the seats of the enclosure to be heated, cooled or ventilated, air chambers of large dimensions relative to the air conduits to which they are connected, and communicating through orifices with the atmosphere in the enclosure. These chambers being underneath the seats of which they form an integral part, do not take up useful space whilst their great capacity permits of sufficiently uniform and silent distribution at a very low pressure of the air supplied to the chambers under a relatively high pressure by the supply pipes.

Another important feature of the invention consists in the provision of regenerative arrangements for effecting an exchange of heat units between the incoming air entering the enclosure and the vitiated air withdrawn therefrom for the purpose of effecting economy in heating or cooling.

The invention is illustrated by way of example in the accompanying drawings in which:—

Figure 1 is a perspective view of a seat with which an air chamber is incorporated in accordance with the invention.

Figure 2 is a vertical transverse section through the seat illustrated in Figure 1 taken on the line 2—2 of Fig. 3.

Figure 3 is a horizontal section through the air chamber of this seat taken on the line 3—3 of Fig. 2.

Figure 4 is a vertical transverse section similar to Figure 2 but illustrating a modified embodiment of the invention.

Figure 5:
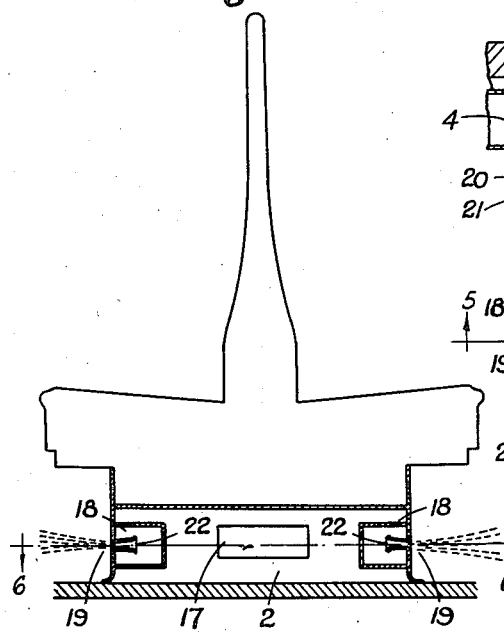
Figure 6:
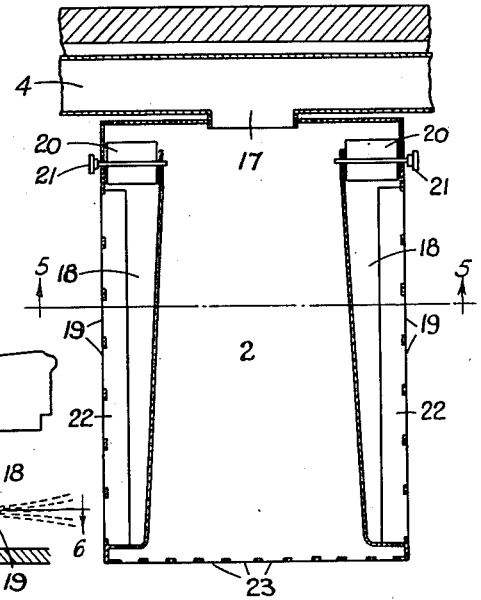
Figure 7:
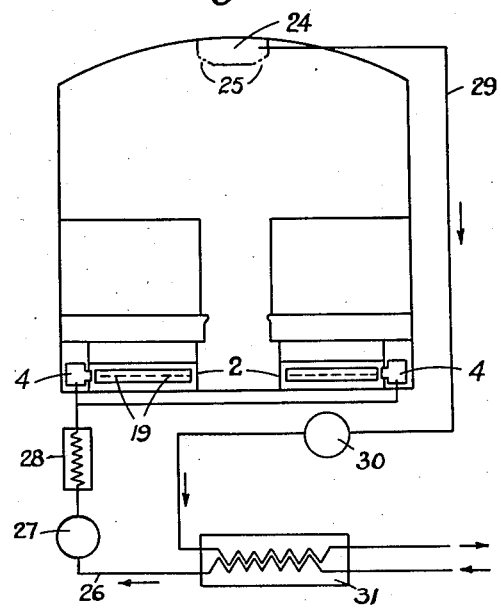

Figure 5 is a vertical transverse section similar to Figure 2 illustrating a further embodiment of the invention taken on the line 6—6 of Fig. 6, and Figure 6 is a horizontal section through the air chamber of the seat illustrated in Figure 5 taken on the line 5—5 of Fig. 6, and Figure 7 is a transverse section of a railroad car showing diagrammatically the regenerative installation associated therewith.

Referring first to Figures 1 to 3 of the drawings, a seat intended more particularly for railroad cars, comprises two seat units 1 located back to back with an air chamber 2 therebetween which constitutes the base of the seat and is itself located on the floor 3 of the car. Into this chamber 2 a compressed air inlet conduit 4 such as a hot air conduit opens (Figure 2). The expansion of this air in the large volume of the chamber lowers its pressure to a value such that it can be distributed to the car through orifices in the chamber, without causing hissing or creating appreciable air currents. Owing to the large number of orifices with which the chamber may be provided by reason of its large dimensions, a true diffusion of air into the atmosphere of the enclosure to be heated, cooled or ventilated is effected.

An extension 6 of the chamber 2 is constituted by the hollow back 7 of the seat and communicates with the atmosphere of the enclosure through orifices 8, including orifices 8a and 8b, and 9 arranged, respectively, at the top of the back of the seat, and at the side thereof.

Furthermore, an internal partition 10 divides the chamber 2 into two compartments 2a and 2b, the back 7 being divided into compartments 6a and 6b by a partition 11 (Figure 1). The compartments 2a and 6a are for example supplied with hot air from the conduit 4, the compartments 2b and 6b being connected to another conduit 12 which is for instance subject to a vacuum. It follows that the hot air supplied to the atmosphere of the enclosure through the orifices 5a and 8a of the compartments 2a, 6a as indicated by the arrows in the drawings, is after circulating and becoming vitiated, drawn in through the orifices 5b, 8b and 9 of the compartments 2b, 6b. The heat contained in this vitiated air may be arranged to be added to the fresh air supplied through the conduit 4 by the exchange of heat in a suitable heat exchanger, thus substantially reducing the cost of heating.

In the arrangement shown, the compartment 2a occupies the greater portion of the chamber 2 and owing to the triangular form of the compartment 2b extends the entire length of the longer walls of the chamber at the foot of which oblique-orifices 5a are provided. Being inclined obliquely downwardly, these orifices supply hot air on to the floor 3 where it spreads in front of the seat before rising in a large column, surrounding the feet and legs of the occupants of the seats.

Obviously the compartment 2a and its orifices 5a may serve equally for supplying cool air for cooling the enclosure, but it is preferably to utilize for this purpose the compartment 2b and the orifices 5b and 9 which are directed in the case of a vehicle towards the gangway at right angles to the seats. This is effected by reversing the direction of circulation of the air in the conduits 4 and 12 and by admitting cold air through the conduit 12 into the compartment 2b, whilst the conduit 4 may be placed under vacuum, so that the vitiated air after circulation in the enclosure may be taken up by the compartment 2a.

The chamber 2 may evidently be divided in an entirely different manner from that shown and, for instance, all the lower orifices 5a, 5b could be employed for distributing the hot air and all the upper orifices 8 and 9 on the back of the seat for distributing the cold air.

The seat shown in Figure 4 is similar on general lines to that described with reference to Figures 1 to 3. However, instead of being simply resting on the floor 3, it is sunk therein as shown at 13 in such a manner that the surface of the floor under the seat need not be covered with a floor-carpet. In the case of composition floor covering, this arrangement possesses the advantage of dividing the floor covering into small panels defined by the free surfaces between the seats and consequently less liable to become cracked by expansion and contraction than a covering extending over the whole floor of the vehicle. On the other hand, the part 13 of the chamber 2 being sunk in the floor increases the volume of the chamber without increasing the floor space occupied.

The hot air entering the chamber 2 through the pipe 4 is guided by baffles 15 to the top of the chamber adjacent the upper edge of the outer chamber walls 14.

The longitudinal walls 14 of the chamber, above the orifices 5a, constitute radiating surfaces for warming the feet of the occupants of the seat. In order to avoid heating the seat units 1 and the back 7 of the seat by the transmission of heat from the air in the chamber through the metal walls thereof, a layer 16 of heat insulating material may be inserted between the chamber and the upholstery of the seat.

In Figures 5 and 6 the air chamber 2 communicates with the hot air conduit 4, through an intake opening 17. In the interior of the chamber two guide passages 18 are provided for supplying the outlet ports 19 which are in the form of elongated slits provided with nozzles having convergent lips 22. The passages 18 are open at the ends adjacent to the intake 17 and these ends are provided with dampers or regulators 20 with external control 21, the guide passages being closed at the opposite ends. As shown in Figure 6 the cross section of the passages 18 decreases from the inlet so as to ensure a uniform supply to all the ports 19.

Opposite the intake 17, the transverse wall of the chamber facing towards the gangway of the car is perforated with holes 23 through which the greater part of the air from the chamber 2 may flow into the gangway where its inflow will not inconvenience the occupants of the seats 2 who are directly and sufficiently heated or cooled by the smaller quantity of air supplied through the ports 19.

As shown in Figure 7 the vitiated air from the car is taken up by a roof conduit 24 preferably having bevelled edges in which ports 25 are provided. This conduit 24 may likewise be used for supplying fresh air to the car when the operation is reversed so that the vitiated air is taken up by the chamber 2. In this case the fresh air is directed laterally downwards on to the occupants of the seats through ports 25 which imparts to the passengers a pleasant sensation of freshness if the air has been previously cooled.

Figure 7 illustrates a fresh air conduit 26 with a fan 27 and a heating device 28 leading to the chambers 2, and a vitiated air conduit 29 with a fan 30 connected to the roof conduit 24. Connected in the fresh air conduit 26, is a heat exchanger 31 in which fresh air is pre-heated by the heat units given up to it by the vitiated air flowing through this exchanger before being exhausted to the exterior. Obviously the circulation in the conduits 26 and 29 may be reversed so that the roof conduit supplies fresh air to the car, this air being preferably cooled by a cooling device inserted in the conduit 29 between the conduit 24 and the heat exchanger 31 in which the vitiated cool air, taken in by the chambers 2 and conducted by the conduit 26, the heating device 28 being out of action, serves to cool the incoming fresh air. In each case the regeneration permits of effecting a substantial saving in the working of the heating or cooling device.

The invention is evidently not limited to the particular constructions or arrangements above described and illustrated by way of examples and various modifications thereof may be adopted within the scope of the appended claims.

Having now described my invention, what I claim as new and desire to secure by Letters Patent is:—

1. Air conditioning apparatus for enclosures, seats within said enclosures provided with supporting means therefor enclosing air chambers which occupy substantially the whole space between the seat and the floor, said chambers being divided into two compartments by a partition, one provided with means for distributing fresh air, and the other provided with means for taking up vitiated air, and orifices for the outflow of air provided in the outer wall of said chambers near the floor and inclined obliquely toward the floor.

2. Air conditioning apparatus for enclosures, seats within said enclosures provided with supporting means therefor enclosing air chambers, said air chambers being divided into two compartments by a partition, one provided with means for distributing fresh air at desired temperatures, and the other provided with means for taking up vitiated air, one of said compartments extending the full length of the air chamber adjacent side walls thereof, and the other compartment extending adjacent a transverse end wall of said chamber.

3. Air conditioning apparatus for enclosures, seats within said enclosures provided with supporting means therefor enclosing air chambers, said air chambers being divided into two compartments, one for distributing fresh air to the enclosure and the other for taking up the vitiated air, a passageway communicating with one of said air chambers and with a supply of air and a passageway communicating with the other of said chambers for carrying away the vitiated air, and a plurality of passageways in the walls of said air chambers for communicating between said air chambers and said enclosure.

4. Air conditioning apparatus for enclosures, seats within said enclosures provided with supporting means therefore enclosing air chambers, said air chambers being divided into two compartments, one for distributing fresh air to the enclosure and the other for taking up the vitiated air, a passageway communicating with one of said air chambers and with a supply of air and a passageway for communicating with the other of said chambers for carrying away the vitiated air, a plurality of passageways in the wall of said air chambers for communicating between said air chambers and said enclosure, and hollow backs for said seats provided with air chambers communicating with the first named air chambers and provided with orifices in their upper edges.

5. Air conditioning apparatus for enclosures, seats within said enclosures provided with supporting means therefor enclosing air chambers, said air chambers being divided into two compartments, one for distributing fresh air to the enclosure at a desired temperature and the other for taking up the vitiated air, passageways communicating with said air chambers and with a supply of air, and a plurality of passageways in the walls of said air chambers for communicating between said air chambers and said enclosure, and hollow backs for said seats provided with air chambers communicating with the first named air chambers and provided with orifices in their upper edges.

6. Air conditioning apparatus for enclosures, seats within said enclosures provided with supporting means therefor enclosing air chambers which occupy substantially the whole space between a seat and the floor, said air chambers being divided into two compartments, one for distributing fresh air at a desired temperature, and the other for taking up vitiated air, one of said compartments extending the full length of the air chamber adjacent side walls thereof, and the other compartment extending adjacent the transverse end wall of said chamber, and orifices for the out-flow of air provided in the outer wall of said chambers near the floor and inclined obliquely toward the floor in front of the seat.

ROBERT HENRI MAUTSCH.